US012766677B2

United States Patent
(12) United States Patent
Ferrell, II

(10) Patent No.: US 12,766,677 B2
(45) Date of Patent: Oct. 20, 2026

(54) HYDRAULIC TORQUE WRENCH SYSTEM

(71) Applicant: INDUSTRIAL BOLTING TECHNOLOGIES, INC., Charleston, WV (US)

(72) Inventor: Roddy Ferrell, II, Charleston, WV (US)

( * ) Notice: Subject to any disclaimer, the term of this patent is extended or adjusted under 35 U.S.C. 154(b) by 279 days.

(21) Appl. No.: 18/744,118

(22) Filed: Jun. 14, 2024

(65) Prior Publication Data

US 2025/0381651 A1 Dec. 18, 2025

(51) Int. Cl.
*B25B 21/00* (2006.01)

(52) U.S. Cl.
CPC .......... *B25B 21/005* (2013.01); *B25B 21/002* (2013.01)

(58) Field of Classification Search
CPC .............................. B25B 21/005; B25B 21/00
USPC ........................ 81/9.4, 54, 57.44, 177.8, 489
See application file for complete search history.

(56) References Cited

U.S. PATENT DOCUMENTS

| | | | | |
|---|---|---|---|---|
| 4,027,561 A * | 6/1977 | Junkers | B25B 21/002 | 81/57.39 |
| 4,200,011 A * | 4/1980 | Wilmeth | B25B 23/0078 | 81/57.39 |
| 5,003,847 A * | 4/1991 | Wagner | B25B 23/145 | 81/57.39 |
| 5,103,696 A * | 4/1992 | Beuke | B25B 21/005 | 81/57.44 |
| 5,142,951 A * | 9/1992 | Walton | B25B 21/005 | 81/57.39 |
| 6,029,546 A * | 2/2000 | Gibson | B25B 13/04 | 81/55 |
| 6,279,427 B1 * | 8/2001 | Francis | B25B 21/005 | 81/58 |
| 6,370,987 B1 * | 4/2002 | Wilson, Jr. | B25B 21/004 | 81/57.39 |
| 6,925,911 B1 | 8/2005 | Koppenhoefer | | |
| 8,499,853 B2 * | 8/2013 | Spirer | B25B 21/004 | 173/217 |
| 9,492,912 B2 | 11/2016 | Spirer | | |
| 11,426,844 B2 | 8/2022 | Koppenhoefer | | |

(Continued)

FOREIGN PATENT DOCUMENTS

| | | | |
|---|---|---|---|
| CN | 203726402 U * | 7/2014 | B25B 21/005 |
| DE | 29607207 U1 * | 10/1997 | |

(Continued)

*Primary Examiner* — Robert F Long
(74) *Attorney, Agent, or Firm* — WELSH FLAXMAN & GITLER LLC

(57) ABSTRACT

A hydraulic torque wrench system including a low profile power head connectable to a ratchet link is disclosed. The power head includes a housing having opposed side walls with a width therebetween. A first connection unit located on the front wall of the housing includes a front projection having a stem and opposed arms. The stem has opposed side walls that extend from the front wall of the housing to a rounded free end. The opposed arms extend laterally from the opposed side walls. The first connection unit is coupled a connection slot in the ratchet link. A second connection unit located on the bottom wall of the housing includes a bottom projection with a bore. The second connection unit is coupled to a bore in the ratchet link by a pin. The opposed arms span a distance that is less than or equal to the width of the housing.

9 Claims, 6 Drawing Sheets

(56) References Cited

U.S. PATENT DOCUMENTS

| | | | | |
|---|---|---|---|---|
| 2003/0136229 | A1* | 7/2003 | Junkers | B25B 21/005 81/57.39 |
| 2003/0211478 | A1 | 11/2003 | Nelson | |
| 2004/0060397 | A1* | 4/2004 | More | B25B 21/005 81/57.39 |
| 2004/0200320 | A1* | 10/2004 | Knopp | B23D 29/005 81/57.39 |
| 2011/0314972 | A1* | 12/2011 | Rickley, III | B25B 21/005 81/57.44 |
| 2015/0231768 | A1* | 8/2015 | Francis | B25B 21/005 29/456 |
| 2018/0133869 | A1* | 5/2018 | Koppenhoefer | B25B 21/005 |
| 2018/0178356 | A1* | 6/2018 | Hohmann | B25B 23/0078 |
| 2019/0105762 | A1* | 4/2019 | Hughes | B25B 21/005 |
| 2020/0006907 | A1* | 1/2020 | Torrey | A01G 3/02 |
| 2020/0316765 | A1* | 10/2020 | Reitzig | B25F 3/00 |
| 2021/0299832 | A1* | 9/2021 | Abbott | B25F 5/00 |
| 2022/0250214 | A1* | 8/2022 | Stickley | B25B 23/1456 |
| 2023/0211478 | A1* | 7/2023 | O'Brien | B25B 21/005 81/57.44 |
| 2023/0339082 | A1* | 10/2023 | Shaw | B25B 23/1456 |
| 2023/0347492 | A1* | 11/2023 | Shaw | B25F 5/005 |
| 2024/0246201 | A1* | 7/2024 | Harvey | B25B 21/005 |

FOREIGN PATENT DOCUMENTS

| | | | | |
|---|---|---|---|---|
| GB | 2284373 | A * | 6/1995 | B25B 21/005 |
| GB | 2573169 | A * | 10/2019 | B25B 21/005 |
| WO | WO-0196072 | A1 * | 12/2001 | B25B 21/005 |
| WO | WO-2016196491 | A1 * | 12/2016 | B25B 21/005 |

* cited by examiner

HYDRAULIC TORQUE WRENCH SYSTEM

BACKGROUND OF THE INVENTION

Hydraulic torque wrenches designed for the transmission of rotational power to threaded fasteners are well known and widely used in a variety of industries. In industrial bolting applications there is often the need for hydraulic torque wrenches with a low profile so they can be used in low clearance applications.

Hydraulic torque wrenches comprising a power head coupled to a ratchet link (that is, hydraulic torque wrench systems) are well known in the art and the industrial bolting industry. While the terms used to refer to the two components forming these hydraulic torque wrench systems sometimes vary, “power head” is a common term in the industry used for the unit that hydraulically drives a piston to reciprocate a piston rod with a working end and “ratchet link” is a common term for a reusable cassette that includes a ratchet mechanism to be driven by the power head.

Hydraulic torque wrench systems generally include a power head and a plurality separable ratchet links designed to be used with different sizes of nuts and bolts. When coupled together the reciprocating piston rod in the power head rotationally drives a ratchet mechanism in the ratchet link to tighten and loosen nuts and bolts. An owner of a hydraulic torque wrench system desires to have one power head that can be coupled to a set of ratchet links for use with different size nuts and bolts. Most power heads on the market are similar in design in the way that they couple to a ratchet link. The power head includes a pin connected at the front end of the power head housing. The pin is retained at opposite ends and extends between the housing, as shown in prior art FIG. 7. The ratchet link includes a connection slot that fits over the pin and between the housing. As such, the power head is always wider than the ratchet link coupled thereto.

An example of a hydraulic torque wrench is shown in U.S. Pat. No. 6,925,911, which is hereby incorporated by reference. This patent also shows a conventional rotational drive system wherein a power head 1 with an internal cylinder 2 containing a piston 3 with a piston rod 4 having a working free end are shown.

While low profile/low clearance hydraulic torque wrench systems are known, the connection between the power head and ratchet link are proprietary as shown in U.S. Pat. No. 11,426,844. As such, the power head will not be able to couple to other manufacturers’ ratchet links that include a connection slot as shown in U.S. Patent Application Publication No. 2023/0211478.

The present invention provides a hydraulic torque wrench system with a power head that is capable of coupling to a variety of ratchet links including the widely used connection slot. The present power head couples with the ratchet link in a manner creating a low profile hydraulic torque wrench system that can be used in tight clearances to improve access of the wrench to fasteners. Additionally, the power head is designed to be used with a variety of ratchet links produced by different manufacturers thereby increasing the usefulness of the power head.

SUMMARY OF THE INVENTION

A hydraulic torque wrench system including a ratchet link and a low profile power head is disclosed. The power head includes a housing having opposed side walls, a front wall, a rear wall, a top wall, and a bottom wall. The housing has a continuous width between opposed side walls. An internal cylinder is formed within the housing. A piston is provided that reciprocates within the internal cylinder. The power head also includes a piston rod that has a first end attached to the piston and an opposite second end in the form of a working free end. The piston rod extends through the front wall of the housing. A first connection unit is located on the front wall of the housing. The first connection unit includes a front projection having a stem and opposed arms located above the working free end of the piston rod. The stem has opposed side walls that extend from the front wall of the housing along a longitudinal axis to a rounded free end. Located adjacent to the rounded free end are the opposed arms. The opposed arms extend from the opposed side walls of the stem laterally from the longitudinal axis. The first connection unit connects to a connection slot in the ratchet link. A second connection unit located on the bottom wall of the housing includes a bottom projection with a bore. The second connection unit connects to a bore in the ratchet link by a pin. The opposed arms span a distance from end to end and this distance is less than or equal to the continuous width of the housing. The opposed arms have a rounded exterior surface that slides within the connection slot in the ratchet link to abut with a closed end of the connection slot.

It is another object to provide a low profile power head used with a ratchet link to form a hydraulic wrench system. The power head includes a housing having opposed side walls, a front wall, a rear wall, a top wall, and a bottom wall. The housing has a continuous width between opposed side walls. An internal cylinder is formed within the housing. A piston is provided that reciprocates within the internal cylinder. The power head also includes a piston rod that has a first end attached to the piston and an opposite second end in the form of a working free end. The piston rod extends through the front wall of the housing. A first connection unit is located on the front wall of the housing. The first connection unit includes a front projection having a stem and opposed arms located above the working free end of the piston rod. The stem has opposed side walls that extend from the front wall of the housing along a longitudinal axis to a rounded free end. Located adjacent to the rounded free end are the opposed arms. The opposed arms extend from the opposed side walls of the stem laterally from the longitudinal axis. The first connection unit is adapted to be connected to a connection slot in a ratchet link. A second connection unit located on the bottom wall of the housing includes a bottom projection with a bore. The second connection unit is adapted to be connected to a bore in a ratchet link by a pin. The opposed arms span a distance from end to end and this distance is less than or equal to the continuous width of the housing. The opposed arms have a rounded exterior surface that slides within a connection slot in a ratchet link to abut with a closed end of the connection slot.

In some embodiments the distance the opposed arms extend end to end equals the continuous width of the housing.

In some embodiments the front projection is integrally formed with the housing.

In some embodiments the opposed arms are circular in cross-section.

DETAILED DESCRIPTION OF THE INVENTION

A low profile hydraulic torque wrench system 10 in accordance with the present invention includes power head 100 which selectively couples to ratchet link 200.

Low profile hydraulic torque wrench system 10 is powered by hydraulic fluid supplied from a hydraulic pump unit (not shown) via pipelines (also not shown). The pipelines are fixed to swivel connector 50 which is connected to the top of power head 100. Power head 100 is separable from ratchet link 200 and is designed to be used with different sizes of ratchet links to tighten or loosen different sized nuts.

Figure 1:
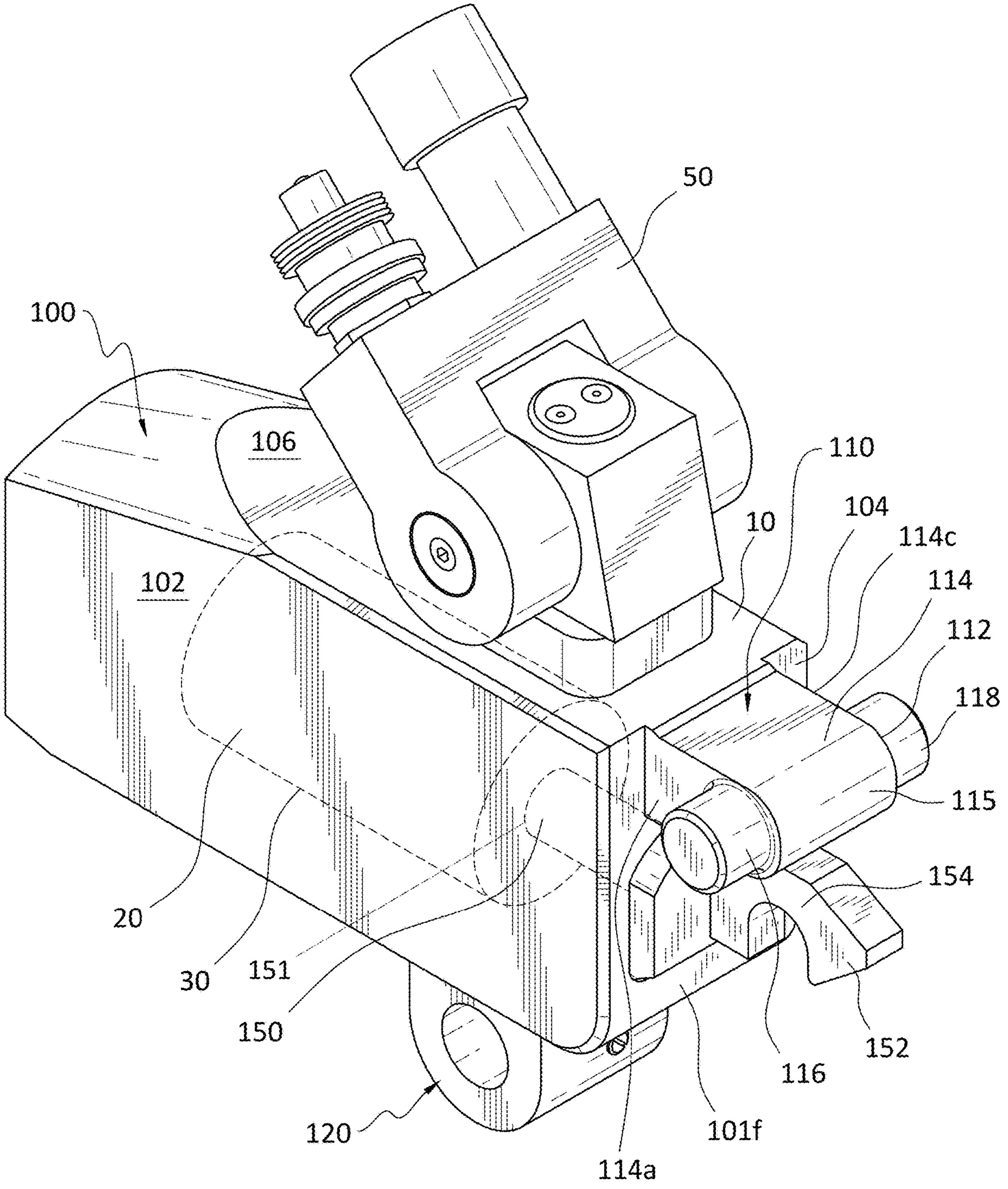
FIG. 1 shows a perspective view of the low profile power head taken from the front and right side of the low profile power head in accordance with the present invention.

Considering now power head 100 of the present invention, power head 100 includes housing 101 about an internal fluid-operated cylinder-piston unit similar to the prior art. The internal fluid-operated cylinder-piston unit includes piston 20, shown in broken lines in FIG. 1, that reciprocates within internal cylinder 30, also shown in broken lines. Internal cylinder 30 is closed at its rear end by threaded plug 35. Piston 20 is attached to piston rod 150. The first end of piston rod 151 is attached to piston 20 and is located within internal cylinder 30 formed by housing 101 and a second end 152 of piston rod 151 is in the form of working free end in the form of hook latch 154 outside of housing 101. Piston rod 150 extends from piston 20 through front wall 101*f* of housing 101 to free second end 152. Free second end 152 is a working free end in the form of hook latch 154 that connects to a lever (not shown) within ratchet link 200 to rotate ratchet mechanism 250 of ratchet link 200, which is well known in art.

Figure 5:
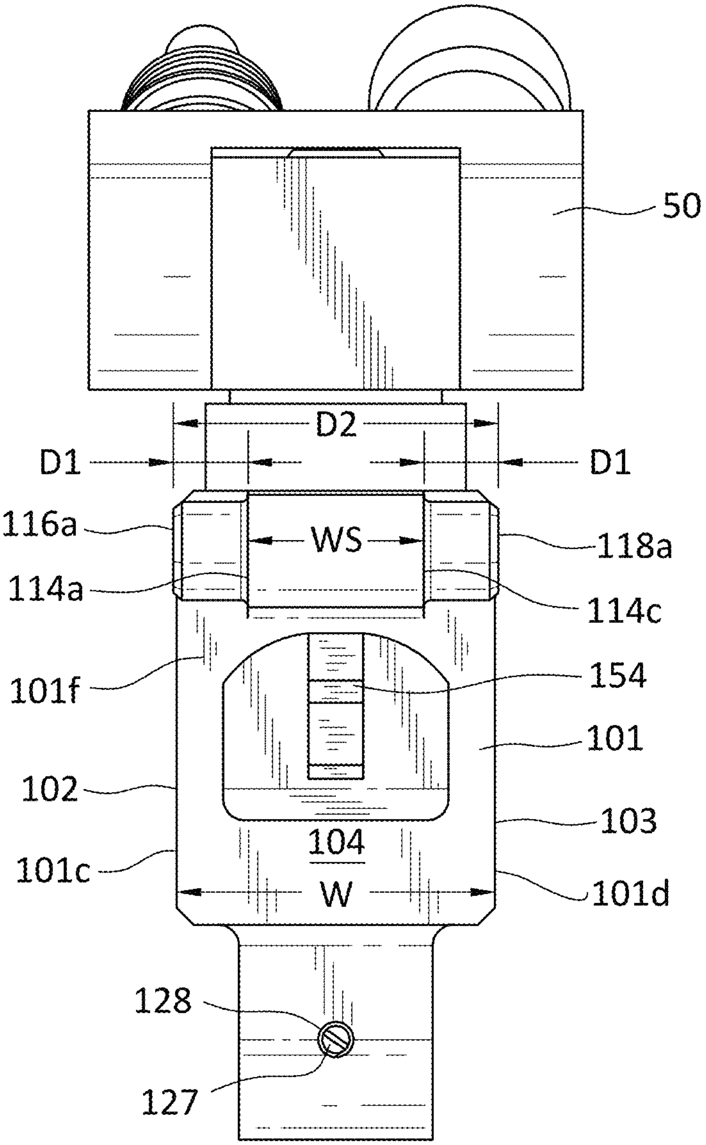
FIG. 5 shows a front view of the low profile power head shown in FIG. 1.

As shown in FIG. 5, housing 101 has a continuous width W between exterior surfaces 102 and 103 of opposed side walls 101*c*, 101*d*. Between opposed side walls 101*c*, 101*d* extends front wall 101*f* having exterior front surface 104, rear wall 101*r* having exterior rear surface 105, top wall 101*t* having exterior top surface 106, and bottom wall 101*b* having exterior bottom surface 107.

Power head 100 connects at first connection point 210 and second connection point 220 on ratchet link 200 by first connection unit 110 and second connection unit 120, respectively. First connection unit 110 extends from front surface 104 of front wall 101*f* and is in the form of front projection 112 integrally formed with housing 101. Front projection 112 includes stem 114 and opposed arms 116, 118 integrally formed with stem 114 above working free second end 152 of piston rod 150. Stem 114 is located above hook latch 154 and coextensive or a.125 inches or less below top wall 101*t* to allow for clearance of ratchet link 200.

Figure 4:
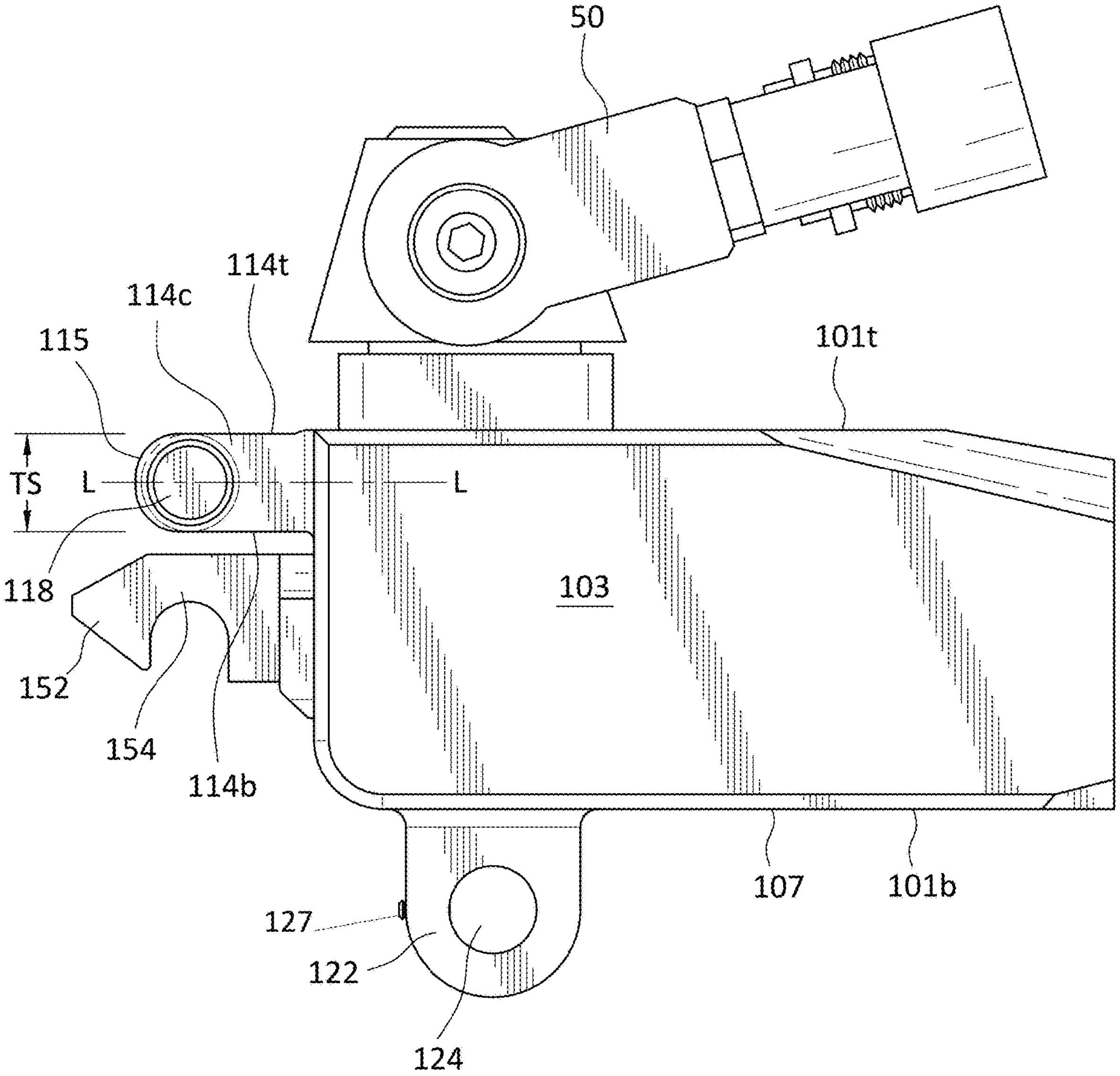
FIG. 4 shows a left side view of the low profile power head shown in FIG. 1.

As best shown FIG. 5, stem 114 has spaced opposed side walls 114*a* and 114*c* and a width "WS." As best shown in FIG. 4 stem 114 has a longitudinal axis L-L. Stem 114 also has top wall 114*t* and opposed bottom wall 114*b*. The distance between top wall 114*t* and opposed bottom wall 114*b* defines a thickness "TS" therebetween. The width "WS" between opposed side walls 114*a* and 114*c* is less than or equal to width "W" of power head 100, as shown in FIG. 5. Stem 114 extends from front surface 102 of front wall 101*f* of housing 101 along the longitudinal axis L-L to radiused/rounded free end 115. Located adjacent radiused/rounded free end 115 are opposed arms 116, 118. Opposed arms 116, 118 extend from opposed side walls 114*a*, 114*c*, respectively and each having a radiused/rounded exterior surface. In the preferred embodiment the radius of opposed arms 116, 118 is 0.25±0.002 inches. The radius of curvature of radiused/rounded free end 115 is slightly greater (0.125±0.002 inches) than the radius of opposed arms 116, 118. It is appreciated that manufacturers of ratchet links (as discussed below in detail) may alter the dimensions of the connection slot and the present invention contemplates corresponding adjustments in the radii of curvature.

Opposed arm 116 extends from side wall 114*a* laterally from the longitudinal axis L-L of stem 114 a distance "D1" and opposed arm 118 extends from side wall 114*c* laterally from the longitudinal axis L-L of stem 114 the same distance "D1." Front projection 112 forms first connection unit 110 which is adapted to be connected to ratchet link 200 at first connection point 210 discussed below in greater detail. Opposed arms 116, 118 span a distance "D2" from end 116*a* of opposed arm 116 to end 118*a* of opposed arm 118. Distance "D2" is less than or equal to width "W" of power head 100.

Second connection unit 120 extends from exterior bottom surface 107 of bottom wall 101*b* and is in the form of bottom projection 122 with bore 124 running there through. Bottom projection 122 may be loop-shaped as shown. Bore 124 aligns with bore 207 in ratchet link 200 when power head 100 and ratchet link 200 are coupled together. Once aligned, pin 125 is slid through bore 207 in ratchet link 200, through bore 124 in power head 100, and then back into bore 207 in ratchet link 200. Pin 125 includes groove 126 about its circumference at the middle thereof. Pin 125 is retained in the power head 100 via set screw 127 that is adjustable in set screw hole 128 to adjust the position and force provided by a spring-loaded ball or other similar mechanisms (not shown) contained within set screw hole 128. The spring-loaded ball cooperates with groove 126 in pin 125 to frictionally retain pin 125 within bore 124 in power head 100 and bore 207 in ratchet link 200.

Ratchet link 200 includes side plates 201 and 202 between which ratchet mechanism 250 is secured. Side plate 201 is spaced from side plate 202 by spacers 203 and 205 and a series of fixing bolts 206 are used to secure the two plates and spacers together. Slide plates 201 and 202 are substantially mirror images of each other and have a thickness. Once slide plates 201 and 202 are secured together, bore 207 and connection slot 209 are formed therebetween. Importantly, the width between the exterior of side plates 201 and 202 is less than or equal to the width "W" of housing 101 of power head 100.

Connection slot 209 includes upper slot wall 209U spaced from lower slot wall 209L by a distance slightly greater than the diameter of opposed arms 116 and 118 of power head 100, so that opposed arms 116 and 118 fit and slide within connection slot 209. Connection slot 209 further includes open end 2090 and opposed closed end 209*c*. Closed end 209*c* is curved and corresponds to the diameter of opposed arms 116, 118 such that opposed arms butt up against and fit within closed end 209*c* when power head 100 is coupled to ratchet link 200. That is, the curvature of closed end 209*c* is slightly larger than the diameter of opposed arms 116, 118.

When ratchet link 200 is secured to power head 100, connection slot 209 aligns with opposed arms 116, 188 to form first connection point 210 and bore 207 aligns with bore 124 to form second connection point 220. First connection point 210 cooperates with first connection unit 110 and second connection point 220 cooperates with second connection unit 120 when ratchet link 200 is secured to power head 100.

First connection unit 110 is highly important to the invention as it permits ratchet link 200 to be connected to power head 100 such that the width "W" of power head 100 is not greater than the width of ratchet link 200 when ratchet link 200 and power head 100 are assembled. Stem 114, as discussed above, extends forward from front wall 101*f* and is integrally formed therewith in order to provide the strength required when securing ratchet link 200 thereto. Opposed arms 116, 118 are integrally formed with stem 114 and have a diameter, if circular, as discussed above and, if not completely circular, have a thickness that is equal to the diameter. The diameter of opposed arms 116, 118 is equal to or slightly smaller (less than.125 inch) than the thickness TS of stem 114. While opposed arms 116, 118 are shown as being circular in cross section, all that is required is that they have an exterior portion that is curved and matches the curvature of closed end 209*c* of connection slot 209 formed in ratchet link 200. Width "WS" of stem 114 is smaller than width "W" of power head and width of ratchet link 200 thereby permitting connection slot 209 to slide over opposed arms 116 and 118. The distance "D1" opposed arm 116 laterally extends from side wall 114*a* is equal to or slightly less (0.125 inch) than the thickness of side plate 202 of ratchet link 200. Just as the distance "D1" opposed arm 118 laterally extends from the side wall 114*c* is equal to or slightly less (0.125 inch) than the thickness of side plate 201 of ratchet link 200.

Figure 2:
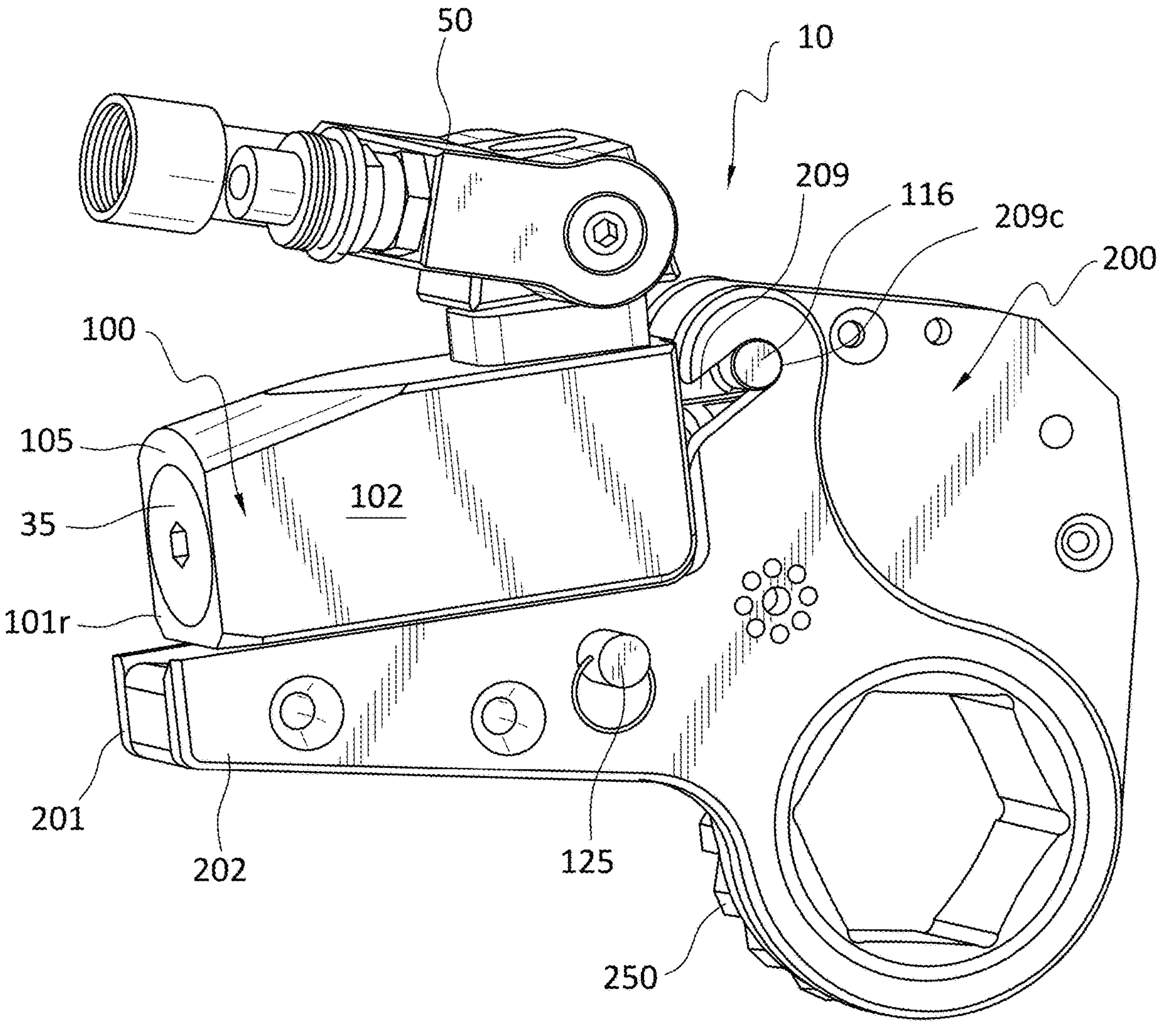
FIG. 2 shows a perspective view of the assembled wrench system taken from the rear and right side.
Figure 3:
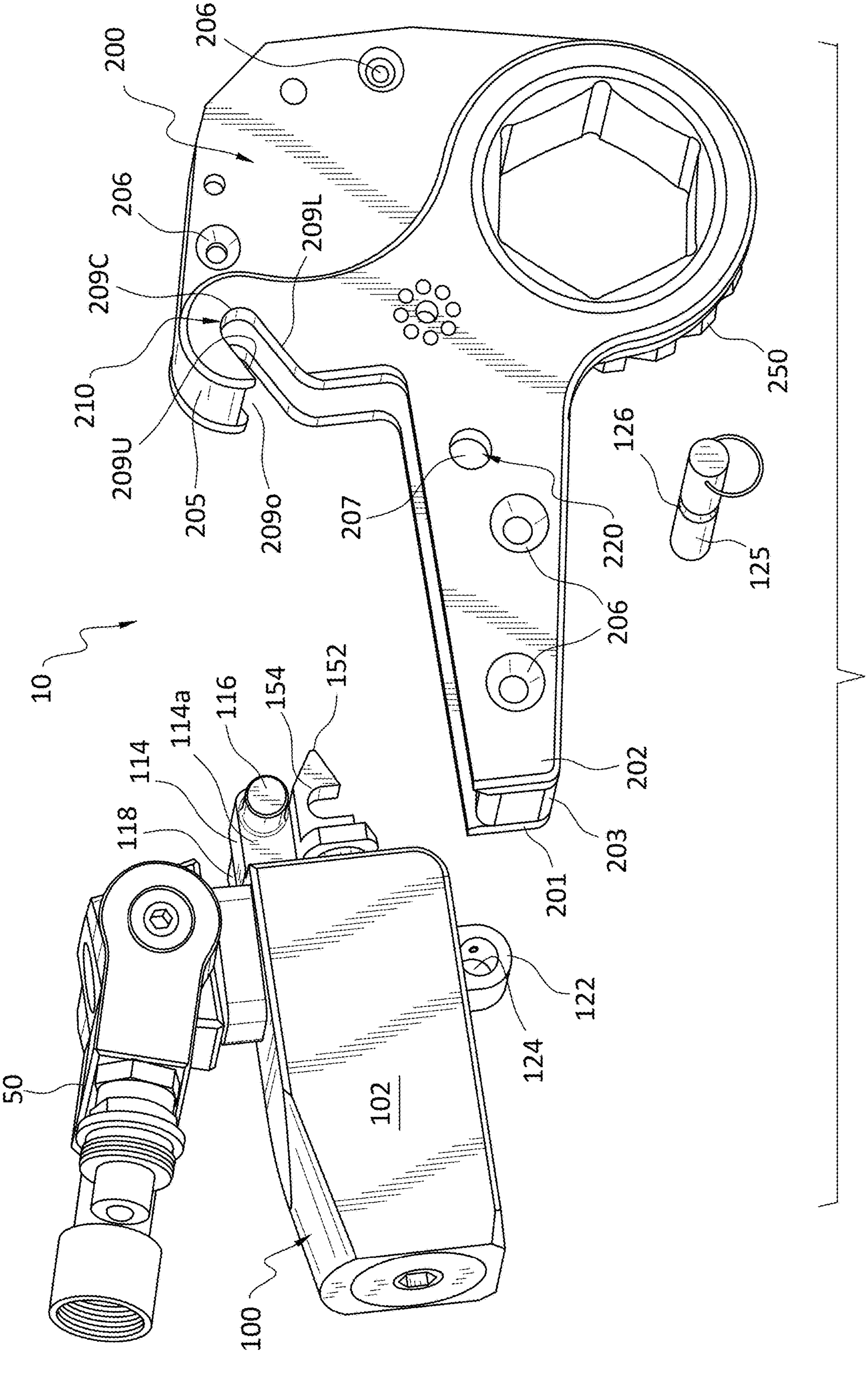
FIG. 3 shows a perspective view of the unassembled wrench system taken from the rear and right side.

Referring to FIG. 2 and FIG. 3, the coupling of power head 100 to ratchet link 200 to form low profile hydraulic torque wrench system 10 is shown. To couple, power head 100 is angled such that opposed arms 116, 118 extending from stem 114 are positioned in open end 2090 of connection slot 209. Power head 100 is then rotated such that opposed arms 116, 118 slide up and travel through connection slot 209 until they abut closed end 209*c* while bottom projection 122 fits between side plates 201 and 202 of ratchet link 200 and bore 124 of power head 100 aligns with bore 207 formed by side plates 201 and 202. Pin 125 is then inserted into aligned bores 124 and 207 and ratchet link 200 is secured to power head 100.

Figure 6:
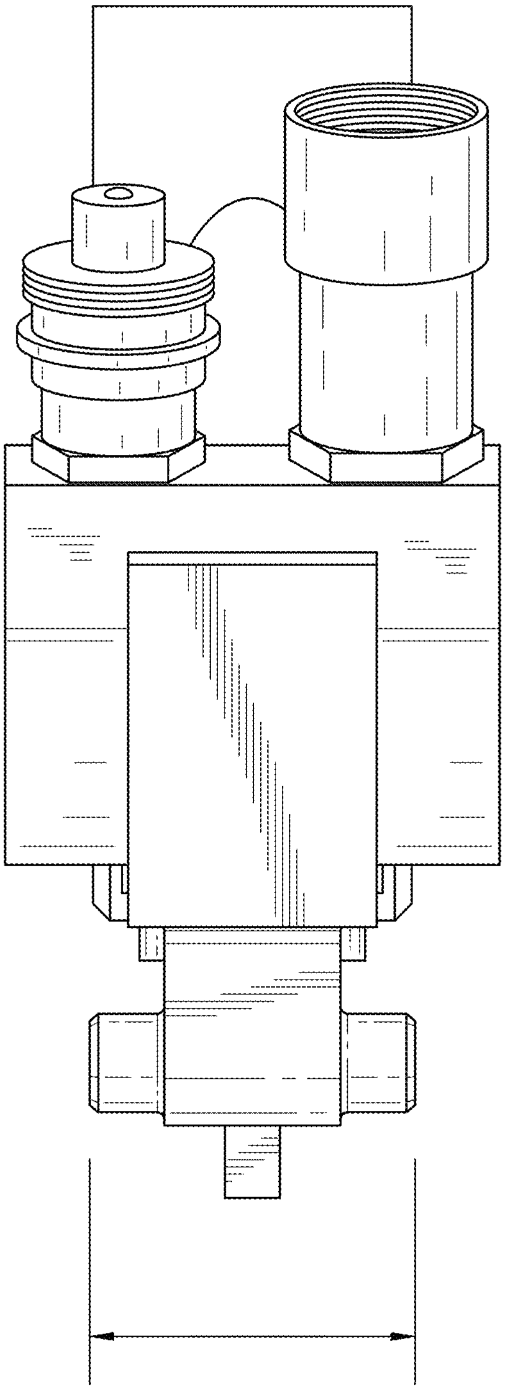
FIG. 6 shows a top view of the low profile power head shown in FIG. 1.
Figure 7:
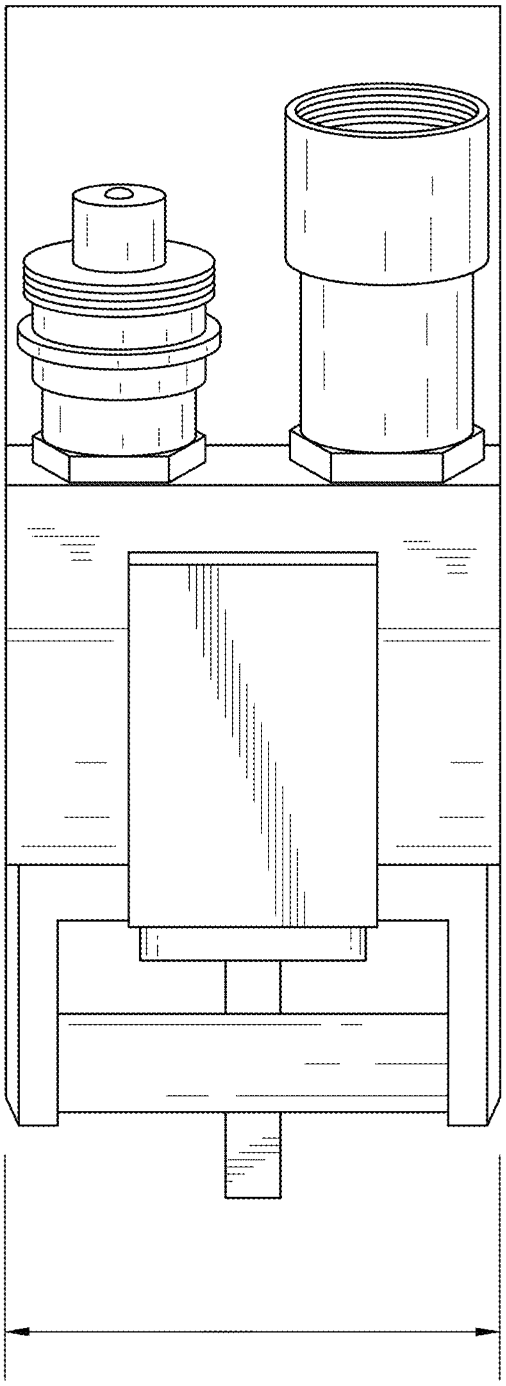
FIG. 7 (PRIOR ART)
FIG. 7 shows a top view of a prior art power head for comparison to the low profile power head of the present invention.

A comparison is shown between the present invention (FIG. 6) and prior art (FIG. 7) in FIGS. 6 and 7. By forming power head 100 with first connection unit 110 with front projection 112 including stem 114 and laterally opposed arms 116, 118, first connection unit 110 is only as wide as housing 101 and can be used with a variety of different ratchet links that include a connection slot. When comparing the double arrow lines in FIG. 6 and FIG. 7, it is noticeable that the width of the prior art power head housing is substantially larger. As shown in FIG. 7 the width of the housing is substantially larger than the present invention as the ratchet link must fit within the housing to secure to the pin.

The invention claimed is:

1. A hydraulic torque wrench system comprising:
- a ratchet link; and
- a low profile power head comprising:
  - a housing having opposed side walls, a front wall, rear wall, top wall and bottom wall, the housing having a continuous width W between opposed side walls;
  - an internal cylinder formed within the housing;
  - a piston that reciprocates within the internal cylinder;
  - a piston rod having a first end attached to the piston and an opposite second end in the form of a working free end, the piston rod extends through the front wall of the housing;
  - a first connection unit located on the front wall of the housing including a front projection having a stem and opposed arms located above the working free end of the piston rod, the stem has opposed side walls that extend from the front wall of the housing along a longitudinal axis to a rounded free end, located adjacent the rounded free end are the opposed arms, the opposed arms extend from the opposed side walls of the stem laterally from the longitudinal axis, the first connection unit connects to a connection slot in the ratchet link;
  - a second connection unit located on the bottom wall of the housing including a bottom projection with a bore, the second connection unit connects to a bore in the ratchet link by a pin; and
  - wherein the opposed arms span a distance D2 from end to end and distance D2 is less than or equal to width W of the housing, the opposed arms have a rounded exterior surface that slide within the connection slot in the ratchet link to abut with a closed end of the connection slot.

2. The low profile power head of claim 1, wherein distance D2 equals W.

3. The low profile power head of claim 1, wherein the front projection is integrally formed with the housing.

4. The low profile power head of claim 1, wherein the opposed arms are circular in cross-section.

5. A low profile power head used with a ratchet link to form a hydraulic torque wrench system, the power head comprising:
- a housing having opposed side walls, a front wall, rear wall, top wall and bottom wall, the housing having a continuous width W between opposed side walls;
- an internal cylinder formed within the housing;
- a piston that reciprocates within the internal cylinder;
- a piston rod having a first end attached to the piston and an opposite second end in the form of a working free end, the piston rod extends through the front wall of the housing;
- a first connection unit located on the front wall of the housing including a front projection having a stem and opposed arms located above the working free end of the piston rod, the stem has opposed side walls that extend from the front wall of the housing along a longitudinal axis to a rounded free end, located adjacent the rounded free end are the opposed arms, the opposed arms extend from the opposed side walls of the stem laterally from the longitudinal axis, the first connection unit is adapted to be connected to a connection slot in a ratchet link;
- a second connection unit located on the bottom wall of the housing including a bottom projection with a bore, the second connection unit is adapted to be connected to a bore in a ratchet link by a pin; and
- wherein the opposed arms span a distance D2 from end to end and distance D2 is less than or equal to width W of the housing, each of the opposed arms has a rounded exterior surface that slides within a connection slot in a ratchet link to abut with a closed end of a connection slot of a ratchet link.

6. The low profile power head of claim 5, wherein distance D2 equals W.

7. The low profile power head of claim 5, wherein the front projection is integrally formed with the housing.

8. The low profile power head of claim 5, wherein the opposed arms are circular in cross-section.

9. The low profile power head of claim 5, wherein the first connection unit and the second connection unit connect the power head to a ratchet link.

* * * * *